(12) United States Patent
Zhang et al.

(10) Patent No.: US 9,313,754 B2
(45) Date of Patent: Apr. 12, 2016

(54) PHY PREAMBLE FORMAT FOR WIRELESS COMMUNICATION SYSTEM

(71) Applicant: Marvell World Trade Ltd., St. Michael (BB)

(72) Inventors: Hongyuan Zhang, Sunnyvale, CA (US); Rohit U. Nabar, Sunnyvale, CA (US); Songping Wu, Cupertino, CA (US)

(73) Assignee: MARVELL WORLD TRADE LTD., St. Michael (BB)

( * ) Notice: Subject to any disclaimer, the term of this patent is extended or adjusted under 35 U.S.C. 154(b) by 20 days.

(21) Appl. No.: 13/751,388

(22) Filed: Jan. 28, 2013

(65) Prior Publication Data

US 2013/0136063 A1     May 30, 2013

Related U.S. Application Data

(63) Continuation of application No. 12/419,460, filed on Apr. 7, 2009, now Pat. No. 8,385,390.

(60) Provisional application No. 61/078,925, filed on Jul. 8, 2008, provisional application No. 61/053,526, filed on May 15, 2008.

(51) Int. Cl.
*H04B 1/00*     (2006.01)
*H04W 56/00*     (2009.01)
(Continued)

(52) U.S. Cl.
CPC ........... *H04W 56/00* (2013.01); *H04B 1/70735* (2013.01); *H04J 13/0014* (2013.01);
(Continued)

(58) Field of Classification Search
CPC .... H04J 13/0014; H04J 13/10; H04L 27/262; H04L 27/2631; H04L 27/2656; H04L 27/2662

USPC ................... 375/150, E01.002, 142
See application file for complete search history.

(56) References Cited

U.S. PATENT DOCUMENTS 6,658,063 B1    12/2003   Mizoguchi et al.
6,683,493 B1    1/2004   Fujimora et al.
(Continued)

FOREIGN PATENT DOCUMENTS

JP    2001148679    5/2001
JP    2002539667    11/2002
(Continued)

OTHER PUBLICATIONS

LAN/MAN Standards Committee of the IEEE Computer Society, Part 15.3: Wireless Medium Access Control (MAC) and Physical Layer (PHY) Specifications for High Rate Wireless Personal Area Networks (WPANs), 2009, IEEE P802.15.3c/D07, Institute of Electrical and Electronics Engineers, Inc., New York, New York.
(Continued)

*Primary Examiner* — Kenneth Lam
*Assistant Examiner* — Sung Ahn (57) ABSTRACT

A system and method of extracting data from data packets transmitted over a wireless network includes receiving a data packet having a preamble portion and a payload portion. The preamble portion is cross correlated with a first known spreading sequence to generate a first timing signal and the preamble portion is cross correlated with a second known spreading signal to generate a frame timing signal. An impulse is detected in the first timing signal and a first timing parameter is set based upon the detected impulse in the first timing signal. An impulse is detected in the frame timing signal and a frame timing parameter is set based upon the detected impulse in the frame timing signal. Data is extracted from the received payload portion according to the first timing parameter and the frame timing parameter.

14 Claims, 9 Drawing Sheets

(51) Int. Cl.
  *H04B 1/7073* (2011.01)
  *H04L 27/26* (2006.01)
  *H04J 13/00* (2011.01)
  *H04J 13/10* (2011.01)
  *H04L 5/00* (2006.01)

(52) U.S. Cl.
  CPC .............. *H04J 13/10* (2013.01); *H04L 27/262* (2013.01); *H04L 27/2613* (2013.01); *H04L 27/2656* (2013.01); *H04L 27/2662* (2013.01); *H04L 5/0016* (2013.01)

(56) References Cited

U.S. PATENT DOCUMENTS

| | | | |
|---|---|---|---|
| 6,771,976 | B1 | 8/2004 | Koyama |
| 7,006,587 | B1* | 2/2006 | Lewis et al. ............... 375/365 |
| 7,280,601 | B2* | 10/2007 | Roberts ............... 375/256 |
| 2003/0171128 | A1 | 9/2003 | Tandai et al. |
| 2004/0101068 | A1* | 5/2004 | Wang et al. ............... 375/324 |
| 2005/0002369 | A1 | 1/2005 | Ro et al. |
| 2005/0058102 | A1 | 3/2005 | Santhoff et al. |
| 2005/0226350 | A1* | 10/2005 | Goto ............... 375/317 |
| 2007/0113159 | A1* | 5/2007 | Lakkis ............... 714/783 |
| 2007/0153761 | A1* | 7/2007 | Fechtel ............... 370/350 |
| 2007/0168841 | A1* | 7/2007 | Lakkis ............... 714/781 |
| 2007/0286314 | A1* | 12/2007 | Herzinger et al. ........... 375/343 |
| 2008/0118016 | A1* | 5/2008 | Chuang et al. ............... 375/359 |
| 2009/0041156 | A1* | 2/2009 | Lakkis ............... 375/300 |
| 2009/0109945 | A1* | 4/2009 | Lakkis ............... 370/338 |
| 2009/0122715 | A1 | 5/2009 | Lakkis |
| 2009/0122751 | A1* | 5/2009 | Murugesu ............... 370/329 |
| 2009/0125792 | A1* | 5/2009 | Lakkis ............... 714/783 |
| 2009/0168849 | A1* | 7/2009 | Rouxel ............... 375/140 |
| 2009/0175261 | A1 | 7/2009 | Oh et al. |
| 2010/0027691 | A1* | 2/2010 | Kent ............... H04L 27/2657 375/260 |
| 2010/0157907 | A1* | 6/2010 | Taghavi Nasrabadi et al. ............... 370/328 |

FOREIGN PATENT DOCUMENTS

| | | |
|---|---|---|
| JP | 2004511995 | 4/2004 |
| JP | 2008072625 | 3/2008 |
| WO | 0054424 | 9/2000 |
| WO | 0235735 | 5/2002 |
| WO | 2011161095 | 12/2011 |

OTHER PUBLICATIONS

International Search Report and Written Opinion of Application No. PCT/US09/039724, issued by the European Patent Office on Jul. 15, 2009 (8 pages).

Notice of Rejection (Office Action) mailed Nov. 6, 2012 in related/corresponding Japanese Patent Appl. No. 2011-509515.

Final Notice of Rejection (Office Action) mailed Aug. 20, 2013 in related/corresponding Japanese Patent Appl. No. 2011-509515.

First Office Action mailed Jan. 22, 2013 in related/corresponding Chinese Patent Appl. No. 200980123723.8.

Second Office Action mailed Aug. 14, 2013 in related/corresponding Chinese Patent Appl. No. 200980123723.8.

* cited by examiner

PHY PREAMBLE FORMAT FOR WIRELESS COMMUNICATION SYSTEM

CROSS-REFERENCE TO RELATED APPLICATIONS

This application is a continuation of U.S. patent application Ser. No. 12/419,460, filed on Apr. 7, 2009, which claims priority from U.S. Provisional Patent Application No. 61/053,526, filed on May 15, 2008, and entitled "PHY Preamble Format for 60 GHz Wideband Wireless Communication Systems," and from U.S. Provisional Patent Application No. 61/078,925, filed on Jul. 8, 2008, and entitled "PHY Preamble Format for 60 GHz Wideband Wireless Communication Systems," the entirety of which are incorporated herein by reference.

FIELD

The technology described in this patent document relates generally to wireless data transmission and more particularly to physical level frame formats for wireless data transmission.

BACKGROUND

Wideband wireless systems operating at high frequencies, such as the 60 GHz frequency range, are able to realize high data rate transmissions in the order of Gigabits per second (Gbps). Wideband wireless systems are able to accomplish these high data rates through the use of very wide channel bandwidths because channel capacity (C) is proportional to channel bandwidth (B) as illustrated in the Shannon-Hartley channel-capacity theorem:

$$C = B * \text{Log}_2(1 + S/N),$$

where S/N is the signal-to-noise power ratio. Because input data sequences tend to be narrowband in nature, to take advantage of the high data-rate capabilities of wideband transmission, narrowband data signals are combined with a noise-like, pseudo-random number sequence that is known to both the transmitter and receiver to spread the data signal over a wide frequency band. The injection of such a "spreading sequence" enables high-speed transmission of the wideband data signals. The wideband data signals are decoupled from the known spreading sequence at the receiver, leaving the narrowband data signals for extraction.

Figure 1:
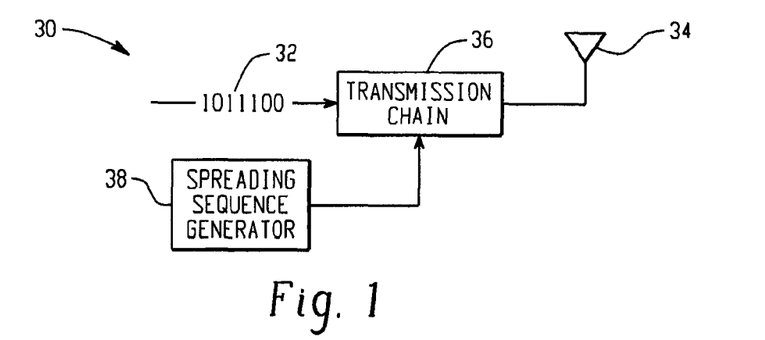
FIG. 1 depicts a block diagram of a spread spectrum transmitter.

FIG. 1 depicts a block diagram of a spread spectrum transmitter. Data signals 32 are transmitted by an antenna 34 via a transmission chain 36. As described above, in order to spread the data signals 32 over a wide frequency band, a spreading sequence provided by a spreading sequence generator 38 is combined with the data signals 32 at some point in the transmission chain 36 to produce a wideband signal to be transmitted via the antenna 34.

Figure 2:
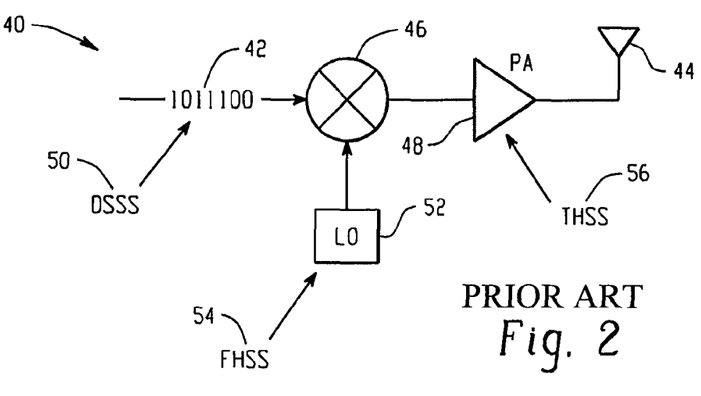
FIG. 2 depicts a block diagram of a system for injecting a spreading sequence at different points in a transmission chain.

Different spread-spectrum techniques are distinguished according to the point in the transmission chain at which a spreading sequence is inserted in the communication channel. FIG. 2 depicts a block diagram of a system for injecting a spreading sequence at different points in a transmission chain. In FIG. 2, data 42 is transmitted by an antenna 44 via a modulator chain 46 and a power amplifier 48. If the spreading sequence is inserted at the data level, as shown at 50, the spectrum spreading is referred to as a direct sequence spread spectrum technique (DSSS). The modulation chain 46 receives the data 42 and a signal from a local oscillator 52. If the spreading sequence is incorporated at the carrier-frequency level, as shown at 54, the spectrum spreading is referred to as a frequency hopping spread spectrum technique (FHSS). Further, if the spreading sequence acts as an on/off gate to the transmitted signal at the power amplifier 48, as shown at 56, the spectrum spreading may be referred to as a time hopping spread spectrum technique (THSS).

Figure 3:
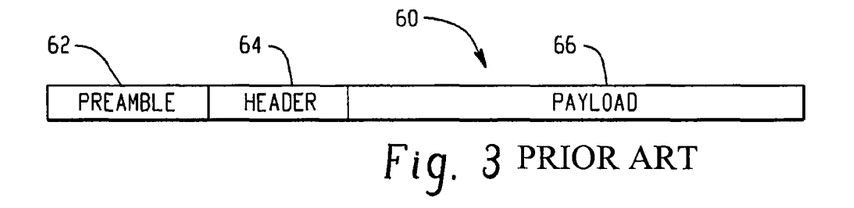
FIG. 3 depicts an example packet format.

A wideband signal may be transmitted as a single carrier signal or a multiple carrier signal, such as an orthogonal frequency-division multiplexing (OFDM) signal. Both single carrier and multiple carrier transmissions may implement the same basic packet format structure shown in FIG. 3. The packet 60 begins with a preamble portion 62 that provides training information to help receiver setup. The preamble portion may include data to assist the receiver: detect the current packet, adjust automatic gain control (AGC) settings, perform frequency and timing synchronizations, set a single carrier/multiple carrier parameter, set a header rate parameter, set a network ID number parameter, set a piconet ID number parameter, as well as setting other setup parameter. A header portion 64 provides information regarding parameters for decoding the packet payload portion 66 such that the receiver may adjust its decoding apparatus accordingly. The header portion 64 may include data regarding the length of the payload portion, modulation and coding methods, as well as other parameter data. The payload portion 66 contains the data sought to be transmitted from the transmitter to the receiver.

Figure 4:
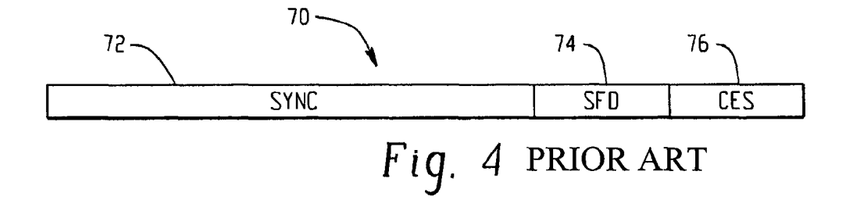
FIG. 4 depicts an example packet preamble format.

FIG. 4 depicts an example packet preamble format. A packet preamble 70 may include a packet synchronization sequence (SYNC) 72 that may be used for determining the start of the packet, frequency/timing synchronization, AGC setting, and other parameter transmission. A start frame delimiter (SFD) 74 may be included in the preamble as a timing reference for the remainder of the packet as well as transmission of other parameters. The channel estimation sequence (CES) 76 may be included for use in channel estimation at the receiver.

Figure 5:
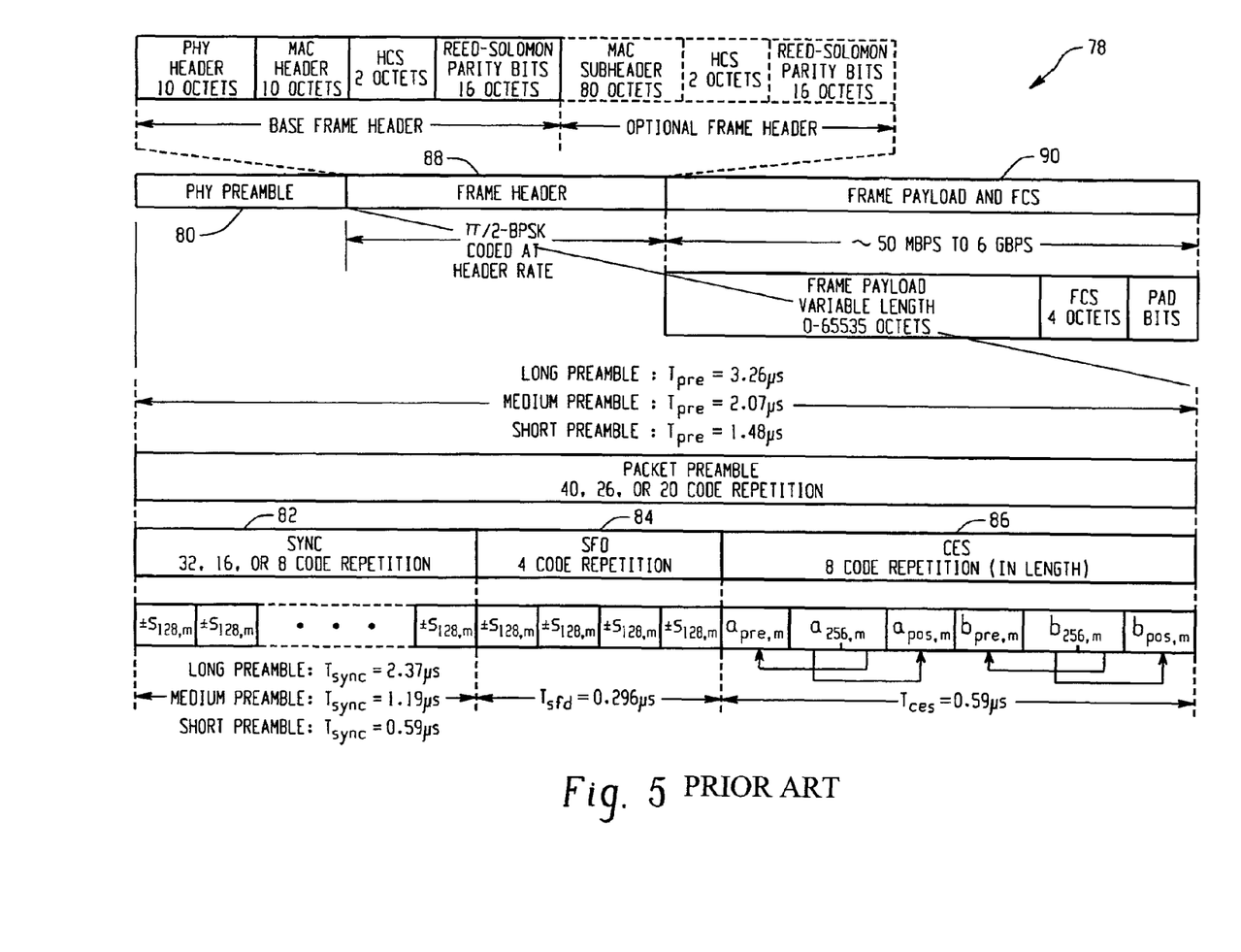
FIG. 5 depicts an 802.15.3c single carrier frame format.

FIG. 5 depicts an example packet structure in the form of an 802.15.3c compliant single carrier frame specification. As noted above, the packet begins with a preamble portion 80 that includes a SYNC segment 82, an SFD segment 84, and a CES segment 86. A frame header portion 88 follows the preamble portion 80, and the frame header 88 is followed by a payload portion 90.

Figure 6:
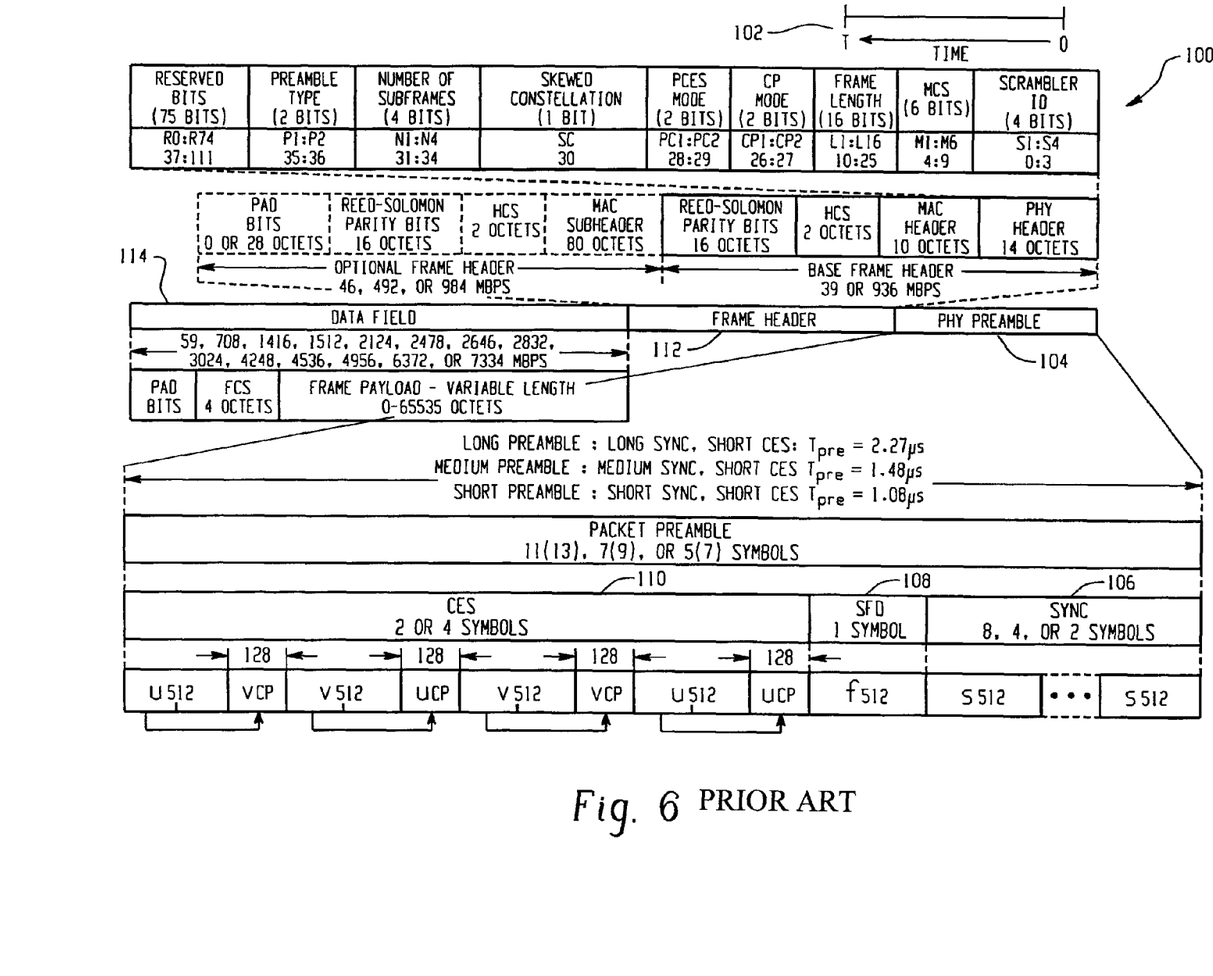
FIG. 6 depicts an 802.15.3c OFDM frame format.

FIG. 6 depicts an example multiple carrier 802.15.3c OFDM frame format. It is noted that the time scale in FIG. 6 runs from right-to-left as indicated at 102. The OFDM packet begins with a preamble portion 104 that includes a SYNC segment 106, an SFD segment 108, and a CES segment 110. The preamble portion 104 is followed by a frame header portion 112 that precedes a data payload portion 114.

Figure 7:
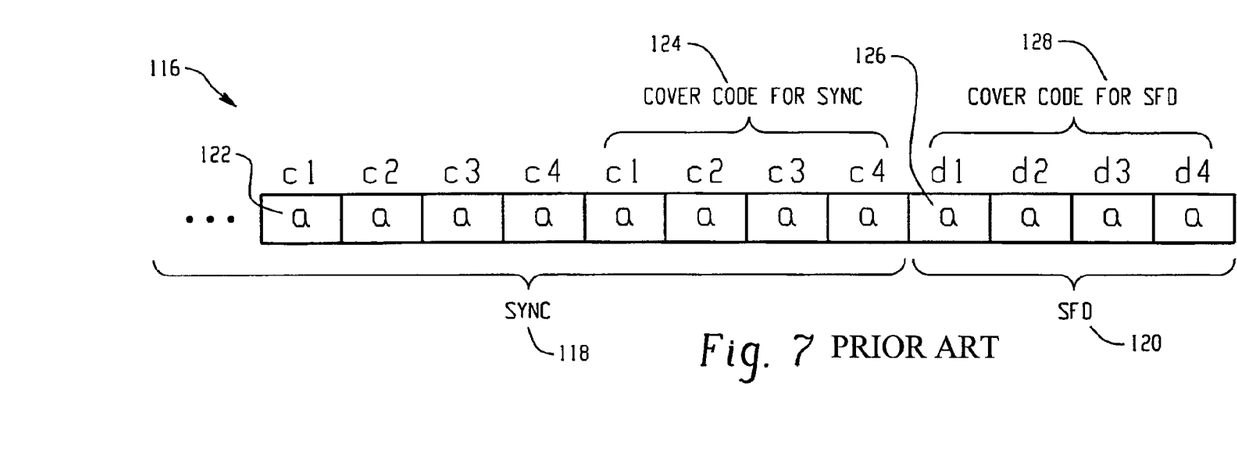
FIG. 7 depicts an example spreading sequence and cover code plan for a preamble portion of a packet.

As described above, narrowband data signals are often spread over a wide bandwidth to take advantage of increased channel capacity available to wideband signals. FIG. 7 depicts an example spreading sequence and cover code plan for a preamble portion of a packet. The depicted preamble portion includes a SYNC segment 118 and an SFD segment 120. The SYNC segment 118 includes data signals combined with a spreading sequence 122 denoted as 'a.' Data is transmitted during the SYNC segment 118 in the form of a repeated cover code 124 that is combined with the spreading sequence, 'a' 122, to generate the wideband data signal. The repeated SYNC cover code 124 may include data instructing the receiver as to frequency/timing synchronization, AGC setting, as well as other parameters.

The SFD segment 120 may be transmitted using the same spreading sequence, 'a,' as is used for the SYNC segment 118 as noted at 126. The SFD segment 120 may include data conveyed via a cover code 128 that is combined with the spreading sequence 126 to generate the wideband data signal. The first segment of the SFD cover code 128 may be selected so as to generate a large phase shift between the last SYNC cover code segment and the first SFD cover code segment. This large phase shift may be detected by a receiver to identify a transition between the SYNC 118 and SFD 120 segments, and the large detected phase shift may be used as a timing reference for the remainder of the packet. Other data, including the length of the CES segment, may be transmitted via the SFD segment cover code 128.

SUMMARY

In accordance with the systems and methods described herein, a system and method of extracting data from data packets transmitted over a wireless network may include receiving a data packet having a preamble portion and a payload portion. The system may further include cross correlating the preamble portion with a first known spreading sequence to generate a first timing signal and cross correlating the preamble portion with a second known spreading signal to generate a frame timing signal. An impulse may be detected in the first timing signal and a first timing parameter may be set based upon the detected impulse in the first timing signal. An impulse may be detected in the frame timing signal and a frame timing parameter may be set based upon the detected impulse in the frame timing signal. Data may be extracted from the received payload portion according to the first timing parameter and the frame timing parameter.

The system may further be characterized by a first portion of the preamble portion that is transmitted with the first known spreading sequence corresponding with a synchronization segment of the preamble portion and a second portion of the preamble portion transmitted with the second known spreading sequence corresponding with a start frame delimiter segment of the preamble portion. A parameter other than the frame timing parameter may be set using a cover code transmitted during a first iteration of the second known spreading sequence at the beginning of the start frame delimiter setting.

A first cover code may be repeated throughout the synchronization segment, where a second cover code is repeated twice at the beginning of the start frame delimiter segment, where the second cover code is complementary to the first cover code. One or more parameters other than the frame timing parameter may be extracted from cover codes transmitted with the second known spreading sequence following the twice repeated second cover code. The first known spreading sequence may be a first Golay sequence and a second known spreading sequence may be a second Golay sequence that is complementary to the first Golay sequence. One or more physical layer parameters may be extracted from cover codes transmitted with the first known spreading sequence or the second known spreading sequence in the preamble portion.

As a further example, a method of extracting data from a received data packet may include receiving a preamble portion and a payload portion of the received data packet. The received preamble portion may be cross correlated with a first known spreading sequence to generate a first timing signal and the received preamble portion may be cross correlated with a second known spreading signal to generate a second timing signal. Impulses may be detected in both the first and second timing signals. A first timing parameter may be set based upon a first in time detected impulse in either the first timing signal or the second timing signal. A frame timing parameter may be set based upon a detected impulse in the second timing signal if an impulse from the first timing signal is used to set the first timing parameter, or a frame timing parameter may be set based upon a detected impulse in the first timing signal if an impulse from the second timing signal is used to set the first timing parameter. A third parameter may be set based upon which timing signal produces the first in time impulse, and data may be extracted from the received payload portion according to the set first timing parameter, the set frame timing parameter, and the third parameter.

As an additional example, a wireless receiver configured to extract data from data packets may include an antenna for receiving a data packet having a preamble portion and a payload portion. A first cross-correlator may be configured to cross correlate the preamble portion with a first known spreading sequence to generate a symbol timing signal, and a second cross-correlator may be configured to cross correlate the preamble portion with a second known spreading sequence to generate a frame timing signal. A first impulse detector may detect an impulse in the symbol timing signal, and a parameter setter may set a symbol timing parameter based upon the detected impulse in the symbol timing signal by the first impulse detector. A second impulse detector may be configured to detect an impulse in the frame timing signal, where the parameter setter is configured to set a frame timing parameter based upon the detected impulse in the frame timing signal by the second impulse detector. A data extractor configured to extract data from the received payload portion according to the set symbol timing parameter and the set frame timing parameter.

The receiver may further be characterized by a first portion of the preamble portion that is transmitted with the first known spreading sequence corresponding with a synchronization segment of the preamble portion and a second portion of the preamble portion transmitted with the second known spreading sequence corresponding with a start frame delimiter segment of the preamble portion. A parameter other than the frame timing parameter may be set using a cover code transmitted during a first iteration of the second known spreading sequence at the beginning of the start frame delimiter setting.

A first cover code may be repeated throughout the synchronization segment, where a second cover code is repeated twice at the beginning of the start frame delimiter segment, where the second cover code is complementary to the first cover code. One or more parameters other than the frame timing parameter may be extracted from cover codes transmitted with the second known spreading sequence following the twice repeated second cover code. The first known spreading sequence may be a first Golay sequence and a second known spreading sequence may be a second Golay sequence that is complementary to the first Golay sequence. One or more physical layer parameters may be extracted from cover codes transmitted with the first known spreading sequence or the second known spreading sequence in the preamble portion.

DETAILED DESCRIPTION

Use of the frame format for the SYNC and SFD segments described with reference to FIG. 7, which uses differing cover codes to differentiate between the SYNC and SFD segments, may result in difficulty in detecting the SYNC/SFD boundary, which identifies the frame timing reference, in receivers suffering from low sensitivity. At the SYNC/SFD boundary, a receiver may use either a coherent or noncoherent method to determine the start of the SFD segment and establish frame timing.

The coherent method performs channel estimation based on the signals of the SYNC portion of the preamble. The coherent method may be performed in an adaptive fashion. However, the SYNC segment may be too short for the channel estimation adaptation to converge to a reliable value. Implementation of the coherent method is complicated and performance may not be guaranteed.

The noncoherent method of detecting the SYNC/SFD boundary is not based on channel estimation and therefore, may be less complicated. However, the noncoherent method may have a low sensitivity, meaning that in suboptimal conditions such as in systems having a low signal-to-noise ratio (SNR), a high delay spread channel, or a carrier frequency offset, the frame timing accuracy may be poor. Because frame timing based on detection of the SYNC/SFD boundary is important to proper receipt of an entire packet, low sensitivity may limit performance.

Figure 8:
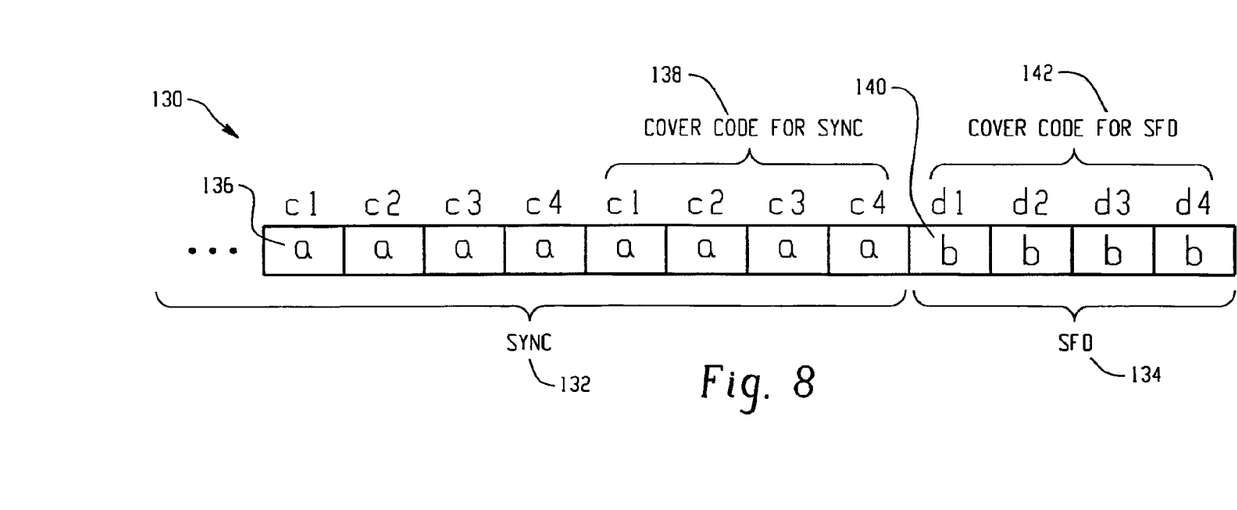
FIG. 8 depicts an example spreading sequence and cover code plan for a preamble portion of a packet having different spreading sequences for the SYNC and SFD segments.

FIG. 8 depicts an example spreading sequence and cover code plan for a preamble portion of a packet having different spreading sequences for the SYNC and SFD segments. The depicted preamble portion includes a SYNC segment 132 and an SFD segment 134. The SYNC segment 132 utilizes a first spreading sequence, 'a' 136, that is combined with a cover code set 138 carrying packet configuration data such as AGC settings. The SYNC segment 132 is followed by the SFD segment 134 that is transmitted using a second spreading sequence, denoted as 'b' 140, which is combined with a set of parameter carrying SFD cover codes 142. Each of the spreading sequences, 'a' 136 and 'b' 140, are known to both the transmitter and the receiver. The use of different spreading sequences for the SYNC and SFD segments enables a non-coherent frame timing mechanism to be utilized for SYNC/SFD boundary detection at a receiver that may be less susceptible to low sensitivity than previous methods. Additionally, the use of the spreading sequence transition to identify the SYNC/SFD boundary frees the first cover code of the SFD segment for meaningful parameter transmission.

Because both of the utilized spreading sequences are known to the transmitter and the receiver, in a system using the preamble frame format described with reference to FIG. 8, the SYNC/SFD boundary may be detected utilizing a cross correlation technique. More specifically, cross correlating a received signal with a known spreading signal will produce an impulse at the beginning of each repetition of that spreading sequence in the received signal. By detecting such impulses, the beginning of a frame and the SYNC/SFD boundary may be identified. For example, a cross correlation such as:

$$C_1(n) = \left| \sum_{k=0}^{N-1} a^*(k) r(n+k) \right|$$

may be utilized, where 'a' is the known SYNC spreading sequence, 'r' is the received signal, and 'N' is the length of the 'a' spreading sequence. A similar cross correlation, such as:

$$C_2(n) = \left| \sum_{k=0}^{M-1} b^*(k) r(n+k) \right|$$

may be utilized to detect the beginning of each SFD spreading sequence repetition, where 'b' is the known SFD spreading sequence, 'r' is the received signal, and 'M' is the length of the 'b' spreading sequence. If 'a' and 'b' are selected spreading sequences having good auto and cross correlation properties, then the periodic cross correlation between 'a' and 'b' will be close to zero while the aperiodic/periodic auto correlation will result in a narrow main lobe and a low level side lobe. Thus, the beginning of a packet may be identified by detecting impulses in the $C_1$ signal, and the SYNC/SFD boundary may be identified by detecting impulses in the $C_2$ signal. Selection of a pair of complementary Golay spreading sequences may enable these results.

Figure 9:
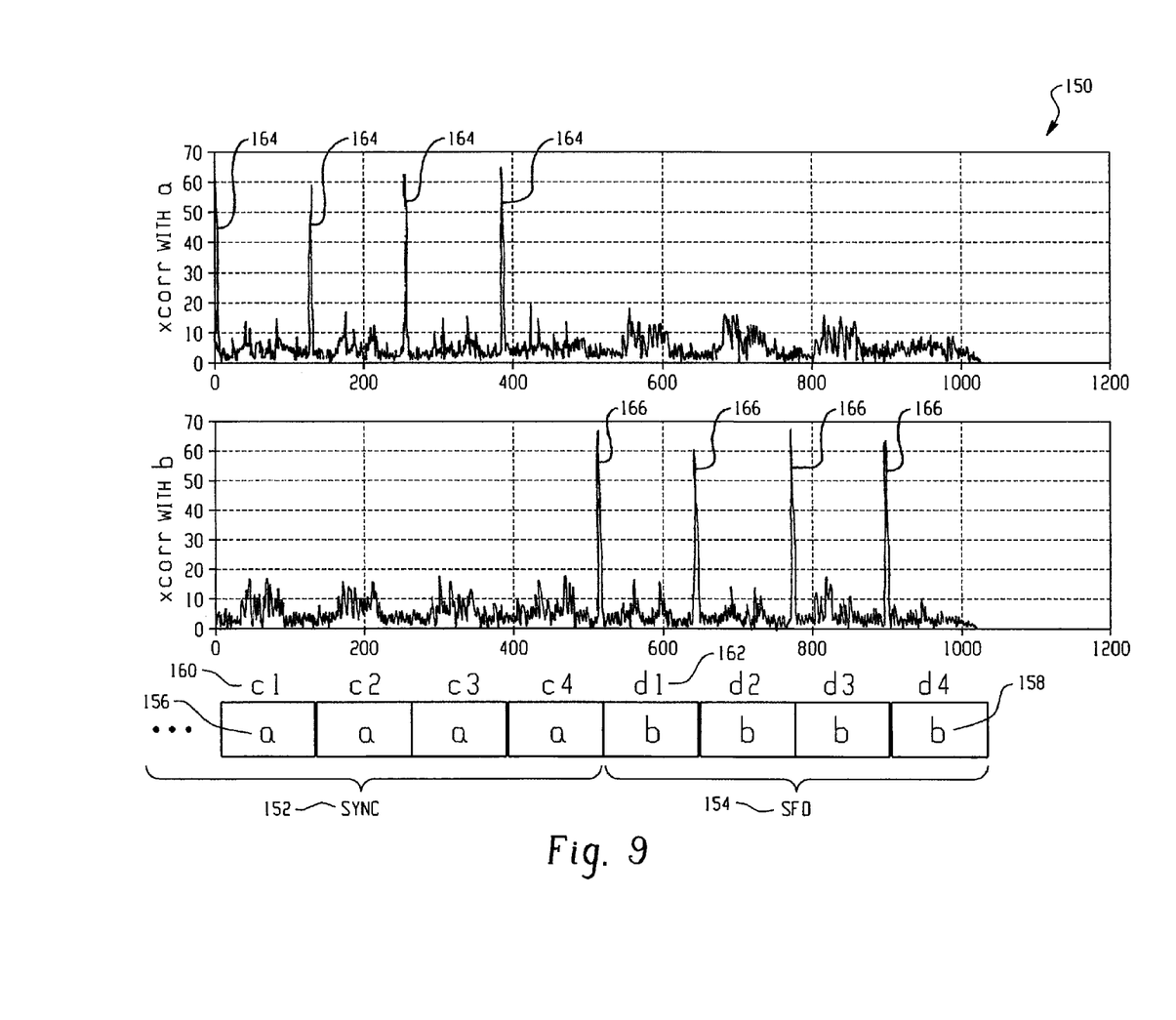
FIG. 9 depicts example cross correlation results for a packet using different spreading sequences for the SYNC and SFD segments.

FIG. 9 depicts example cross correlation results for a packet using different spreading sequences for the SYNC and SFD segments. The illustrated preamble portion shows a SYNC segment 152 and an SFD segment 154, where the SYNC segment 152 is transmitted using a first spreading sequence, 'a' 156, and the SFD segment 154 is transmitted using a second spreading sequence, 'b' 158. The SYNC 152 and SFD 154 segments may carry other parameter data in their respective cover codes 160, 162. The two graphs of FIG. 9 depict cross correlations using the above described formulas in a low delay spread channel system having an SNR of ~10 dB using complementary Golay spreading sequences. As illustrated at 164, the beginning of each 'a' spreading sequence 156 is marked by an impulse 164 in the $C_1$ signal depicting a cross correlation of the received signal and the 'a' spreading sequence. As shown at 166, the beginning of each 'b' spreading sequence 158 is marked by an impulse 166 in the $C_2$ signal depicting the cross correlation of the received signal and the known 'b' spreading sequence. Thus, the beginning of the packet may be identified by detecting the first $C_1$ impulse 164, and the SYNC/SFD boundary may be identified by detecting the first $C_2$ impulse 166.

Figure 10:
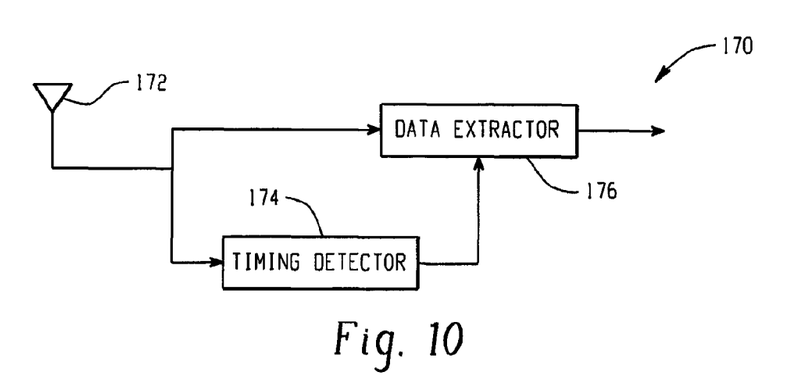
FIG. 10 depicts a block diagram of a receiver.

FIG. 10 depicts a block diagram of an example receiver configured to detect the start of a packet and the SYNC/SFD boundary using the above described cross correlation technique. The receiver 170 receives a wirelessly transmitted signal via an antenna 172. The received signal is propagated to both a timing detector 174 and a data extractor 176. The timing detector 174 identifies the start of the packet, the SYNC/SFD boundary for frame timing, and may identify other transmitted parameters. The timing detector 174 propagates these timing and other setup parameters to the data extractor 176 for proper extraction of the transmitted payload data.

Figure 11:
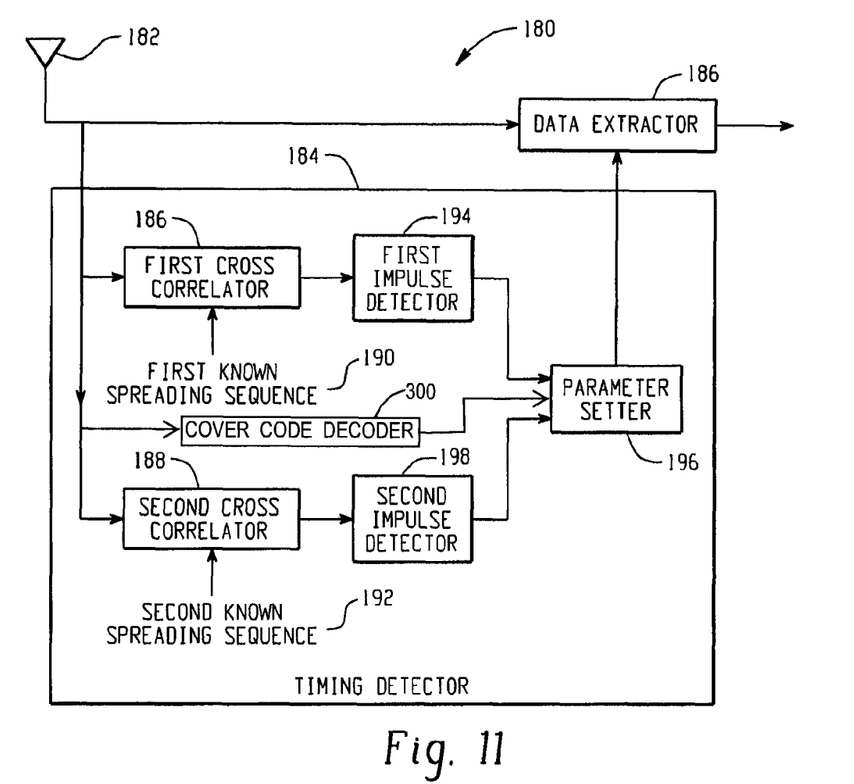
FIG. 11 depicts a block diagram illustrating components of a timing detector in detail.

FIG. 11 depicts a block diagram illustrating components of an exemplary timing detector in detail. The receiver 180 receives a wirelessly transmitted data signal via an antenna 182. The received signal is propagated to both a timing detector 184 and a data extractor 186. The received signal is passed within the timing detector 184 to a first cross correlator 186 and a second cross correlator 188. The first cross correlator 186 also receives a first known spreading sequence 190, and the second cross correlator 188 further receives a second known spreading sequence 192. The first cross correlator 186 cross correlates the received signal with the first known spreading sequence 190 to generate a symbol timing signal. A first impulse detector 194 detects impulses in the symbol timing signal and alerts the parameter setter 196 to identify the start of a packet. The second cross correlator 188 cross correlates the received signal with the second known spreading sequence 192 to generate a frame timing signal. A second impulse detector 198 detects impulses in the frame timing signal and alerts the parameter setter 196 to set the frame timing reference. These timing signals as well as any other packet handling/decoding parameters identified by the timing detector 184 are passed from the parameter setter 196 to the data extractor 186 for use in extracting payload data. A cover code decoder 300 is configured to extract one or more physical layer parameters from cover codes transmitted with the first known spreading sequence or the second known spreading sequence in the preamble portion.

The above described framework may be extended such that the spreading sequence transition may identify additional PHY/MAC parameters beyond the SYNC/SFD boundary frame timing. For example, the beginning of a packet may be identified by detection of an impulse in either of the $C_1$ cross correlation of a received signal with a first spreading sequence or the $C_2$ cross correlation with a second spreading sequence. The SYNC/SFD boundary frame timing may then be identified by an impulse in the other cross correlation signal that was not used to identify the start of a packet. Meaningful parameter data may then be determined from the order in which the spreading sequences were used. For example, if the 'a' spreading sequence was used in the SYNC segment and the 'b' spreading sequence was transmitted with the SFD segment, then a single carrier payload portion may be forthcoming. Alternatively, if the 'b' spreading sequence was transmitted with the SYNC segment and the SFD segment was sent using the 'a' spreading sequence, then an OFDM payload portion may follow.

Further, more than two spreading sequences may be utilized, requiring further cross correlators in the receiver. The first impulse detected in a cross correlator would mark the start of a packet, and the first impulse in a different cross correlator would mark the SYNC/SFD boundary. The two spreading sequences identified as having caused the cross correlation impulses and their order could identify one or more parameters of the incoming signal. Additionally, cover codes may still be utilized to transmit parameter data.

Figure 12:
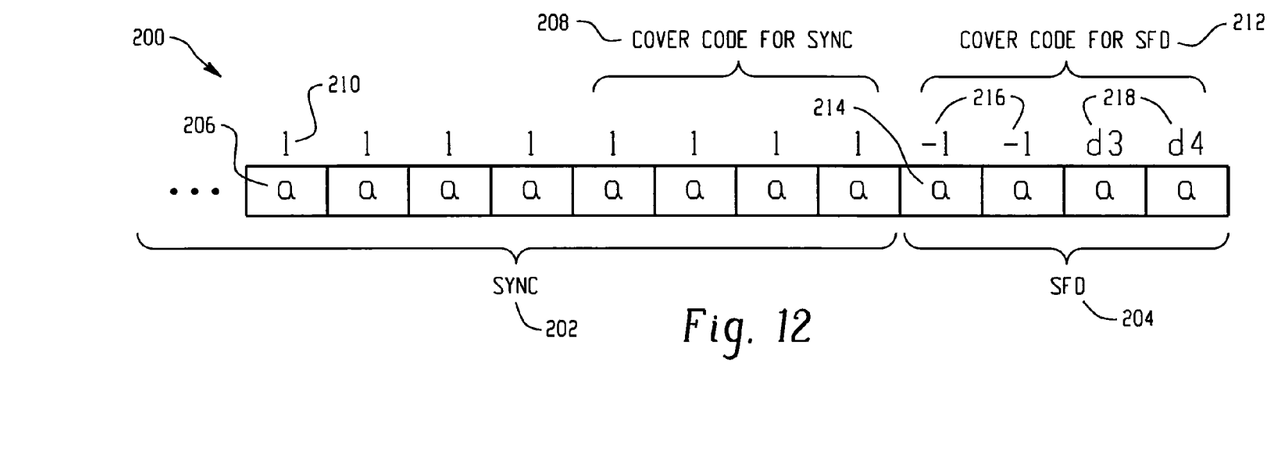
FIG. 12 depicts an example spreading sequence and cover code plan for a preamble portion of a packet having a complementary cover code transmitted in the first two slots of an SFD segment.

FIG. 12 depicts an example spreading sequence and cover code plan for a preamble portion of a packet having a complementary cover code transmitted in the first two slots of the SFD segment. The depicted preamble portion illustrates a SYNC segment 202 and an SFD segment 204. The example SYNC segment 202 is transmitted using a first spreading sequence, 'a' 206, and carries a SYNC cover code 208 that is a constant value of '1' as identified at 210. The SFD segment 204 is also transmitted using the 'a' spreading sequence as shown at 214. The SFD segment cover code 212 includes a '−1' value for the first two segment portions as shown at 216 and may include other cover code values that convey meaningful parameter data as shown at 218. The SYNC cover code could be set to a value other than 1. However, all of the SYNC cover codes of this example are the same, and the first two cover code portions of the SFD segment are complementary to the SYNC cover code value.

The packet preamble configuration of FIG. 12 may be advantageous in systems that suffer from low sensitivity, which may have difficulty identifying the SYNC/SFD boundary for frame timing. The use of two SFD segment cover code portions that are complementary to the SYNC segment cover code portion 208 may aid in detection of the SYNC/SFD boundary by maintaining the large phase shift between the last cover code of the SYNC segment and the first cover code portion of the SFD segment for a longer period of time.

Figure 13:
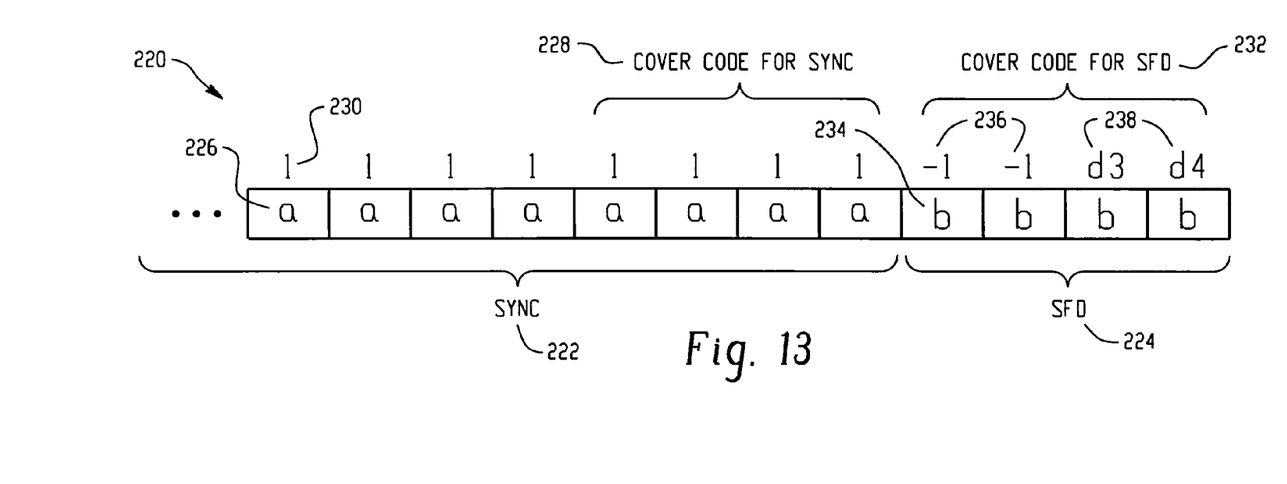
FIG. 13 depicts an example spreading sequence and cover code plan for a preamble portion of a packet having different spreading sequences for the SYNC and SFD segments and a complementary cover code transmitted in the first two slots of the SFD segment.

FIG. 13 depicts an example spreading sequence and cover code plan for a preamble portion of a packet having different spreading sequences for the SYNC and SFD segments and a complementary cover code transmitted in the first two portions of the SFD segment. This packet preamble format combines the advantages described with reference to FIG. 12 with the benefits of the use of different spreading sequences for the SYNC and SFD segments. FIG. 13 depicts a SYNC segment 222 and an SFD segment 224. The SYNC segment 222 is transmitted using a spreading sequence, 'a' 226, and carries cover codes 228 that repeat a value, such as '1,' for all portions of the SYNC segment 222. The SFD segment 224 is transmitted using a second spreading sequence, 'b' 234. The first two portions of the cover codes 232 of the SFD segment 224 are complementary to the repeated SYNC cover code 228 as identified by the '−1s' at 236. The remaining cover codes 238 of the SFD segment 224 may be used to transmit other meaningful parameter data. A receiver receiving a packet having the preamble format shown in FIG. 13 may use either or both of the differing spreading sequences and complementary cover codes to identify the SYNC/SFD boundary for frame timing. The use of both identifiers may improve boundary identification, resulting in better performance capabilities over the use of one of the individual identifiers alone.

Figure 14:
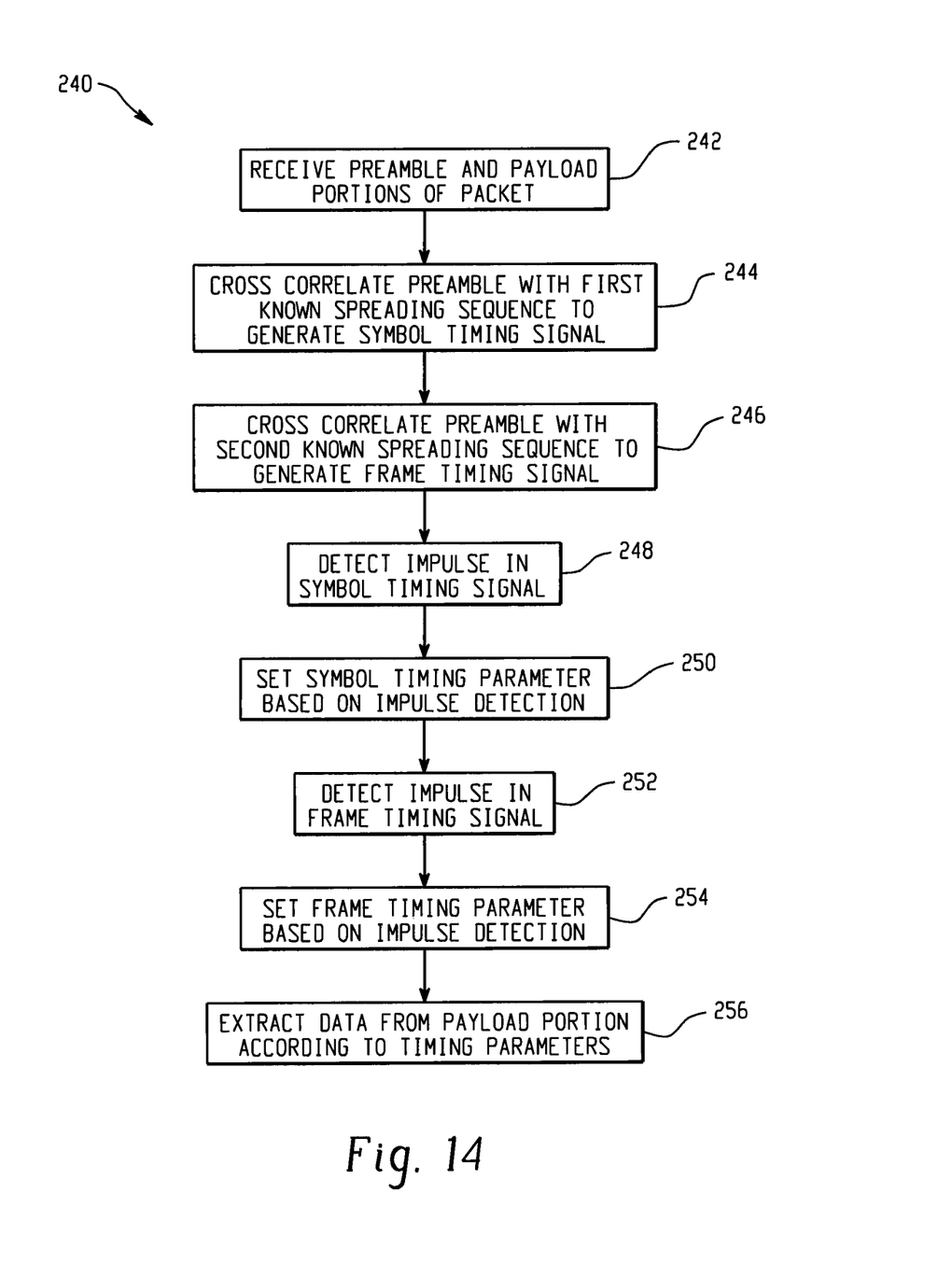
FIG. 14 depicts a flow diagram illustrating a process for extracting data from a received data packet transmitted over a wireless network.

FIG. 14 depicts a flow diagram illustrating a process for extracting data from a received data packet transmitted over a wireless network. A computer-implemented method of extracting data from a received data packet transmitted over a wireless network may receive a preamble portion and a payload portion of the received data packet as shown at 242. The received preamble portion may be cross correlated with a first known spreading sequence, as shown at 244, to generate a symbol timing signal, and the received preamble portion may be cross correlated with a second known spreading sequence, as shown at 246, to generate a frame timing signal. An impulse may be detected in the symbol timing signal, as shown at 248, and a symbol timing parameter may be set based upon the impulse detection in the symbol timing signal at 250. At 252, an impulse may be detected in the frame timing signal, and a frame timing parameter may be set based upon the detection of an impulse in the frame timing signal at 254. Data may be extracted from the received payload portion according to the set symbol timing parameter and frame timing parameter, as shown at 256.

Figure 15:
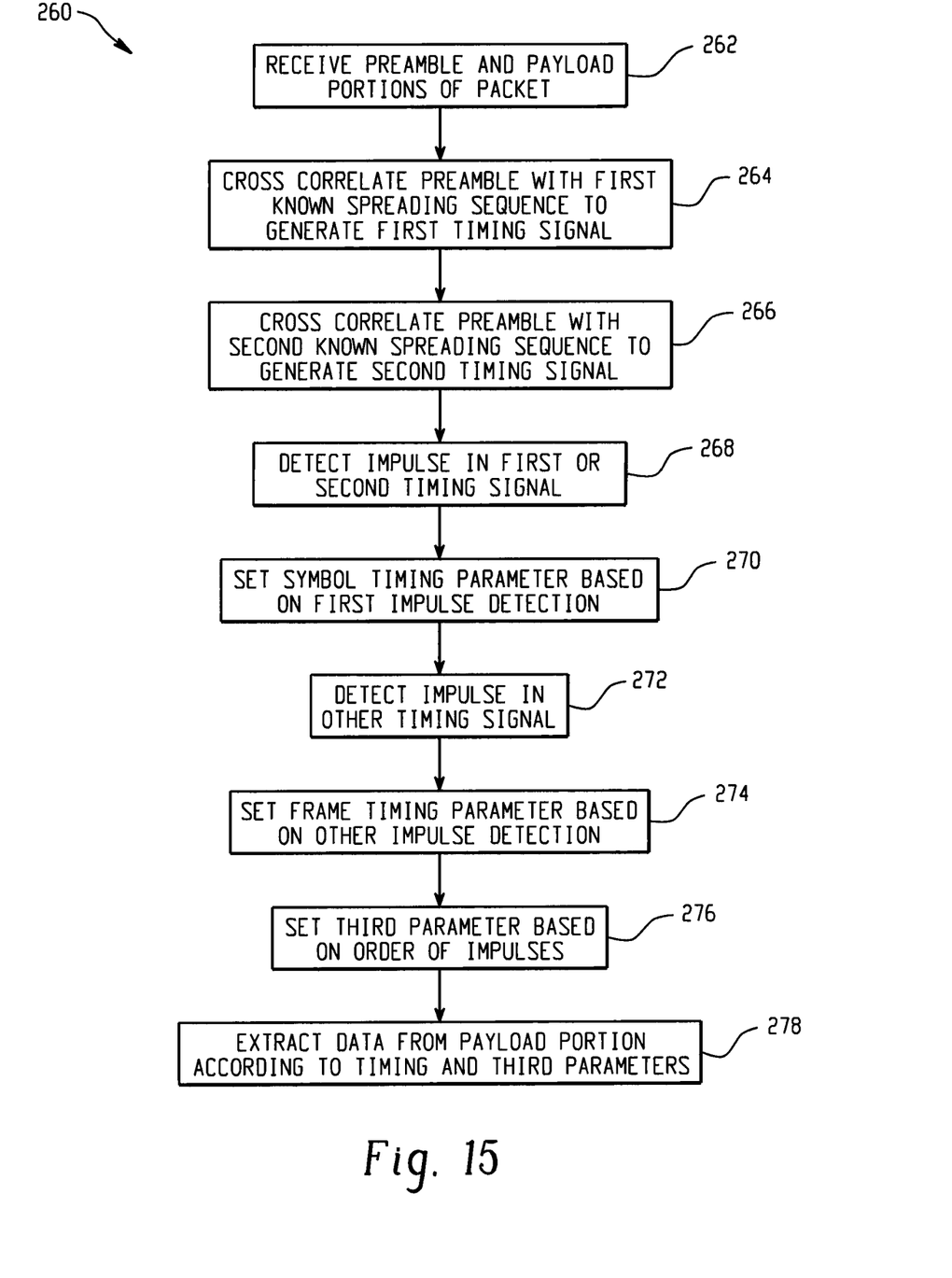
FIG. 15 depicts a flow diagram illustrating another process for extracting data from a received data packet transmitted over a wireless network.

FIG. 15 depicts a flow diagram illustrating another process for extracting data from a received data packet transmitted over a wireless network. A computer-implemented method of extracting data from a received data packet may include receiving a preamble portion and a payload portion of the received data packet, as shown at 262. At 264, the received preamble portion may be cross correlated with a first known spreading sequence to generate a first timing signal, and at 266, the received preamble portion may be cross correlated with a second known spreading signal to generate a second timing signal. A first impulse is detected in one of the first or second timing signals at 268, and a symbol timing parameter is set based on the first impulse detection at 270. At 272, an impulse is detected in the other timing signal, and a frame timing parameter is set based on the other impulse detection at 274. At 276, a third parameter is set based on the order of the impulses. Data is extracted from the payload portion of the packet at 278 according to the timing and the third parameters.

This written description uses examples to disclose the invention, including the best mode, and also to enable a person skilled in the art to make and use the invention. It should be noted that the systems and methods described herein may be equally applicable to other configurations. For example, the proposed frame format, transmitters, and receivers may be extended for other wireless systems that are not constrained to 60 GHz systems such as future WLAN systems, WiMax, WPAN, cellular systems, etc. The system may also include a computer-readable memory configured to store extracted data. The patentable scope of the invention may include other examples that occur to those skilled in the art.

The invention claimed is:

1. A method performable by a receiver, the method comprising:
   receiving a data packet from a transmitter,
      wherein the data packet includes a preamble and a payload,
      wherein the preamble includes (i) a synchronization sequence (SYNC), (ii) a start frame delimiter (SFD), (iii) a first cover code combined with a first spreading sequence, and (iv) a second cover code that is combined with a second spreading sequence different than the first spreading sequence,
      wherein each of the spreading sequences is a pseudo-random number sequence that is known to both the transmitter and the receiver, and
      wherein the spreading sequences have (i) a first order in which the first spreading sequence is in the SYNC and the second spreading sequence is in the SFD or (ii) a second order in which the second spreading sequence is in the SYNC and the first spreading sequence is in the SFD;
   cross correlating the preamble with the spreading sequence to generate a timing signal;
   extracting payload data from the payload based on the timing signal;
   extracting, from the cover codes, a network identification number; and
   extracting, based on whether the spreading sequences are in the first order or the second order, a determination whether the payload is single carrier or multiple carrier.

2. The method of claim 1, wherein the timing signal is a frame timing signal.

3. The method of claim 1, further comprising extracting, from the cover codes, an automatic gain control parameter.

4. The method of claim 1, further comprising extracting, from the cover codes, a header rate parameter.

5. The method of claim 1, further comprising extracting, from the cover codes, a piconet ID number.

6. The method of claim 1, wherein the data packet is received over a cellular system.

7. A receiver comprising:
   an antenna configured to receive a data packet from a transmitter,
      wherein the data packet includes a preamble and a payload,
      wherein the preamble includes (i) a synchronization sequence (SYNC), (ii) a start frame delimiter (SFD), (iii) a first cover code combined with a first spreading sequence, and (iv) a second cover code that is combined with a second spreading sequence different than the first spreading sequence,
      wherein each of the spreading sequences is a pseudo-random number sequence that is known to both the transmitter and the receiver, and
      wherein the spreading sequences have (i) a first order in which the first spreading sequence is in the SYNC and the second spreading sequence is in the SFD or (ii) a second order in which the second spreading sequence is in the SYNC and the first spreading sequence is in the SFD;
   a cross-correlator configured to cross correlate the preamble with the spreading sequence to generate a timing signal;
   a data extractor configured to extract payload data from the payload based on the timing signal;
   a cover code decoder configured to extract, from the cover codes, a network identification number;
   wherein the cross-correlator is further configured to extract, based on whether the spreading sequences are in the first order or the second order, a determination whether the payload is single carrier or multiple carrier.

8. The receiver of claim 7, wherein the timing signal is a frame timing signal.

9. The receiver of claim 7, wherein the cross-correlator is further configured to extract, from the cover codes, an automatic gain control parameter.

10. The receiver of claim 7, wherein the cross-correlator is further configured to extract, from the cover codes, a header rate parameter.

11. The receiver of claim 7, wherein the cross-correlator is further configured to extract, from the cover codes, a piconet ID number.

12. The receiver of claim 7, wherein the data packet is received over a cellular system.

13. The method of claim 5, further comprising extracting, from the cover codes, an automatic gain control parameter.

14. The receiver of claim 11, wherein the cross-correlator is further configured to extract, from the cover codes, an automatic gain control parameter.

* * * * *